Figure 3:
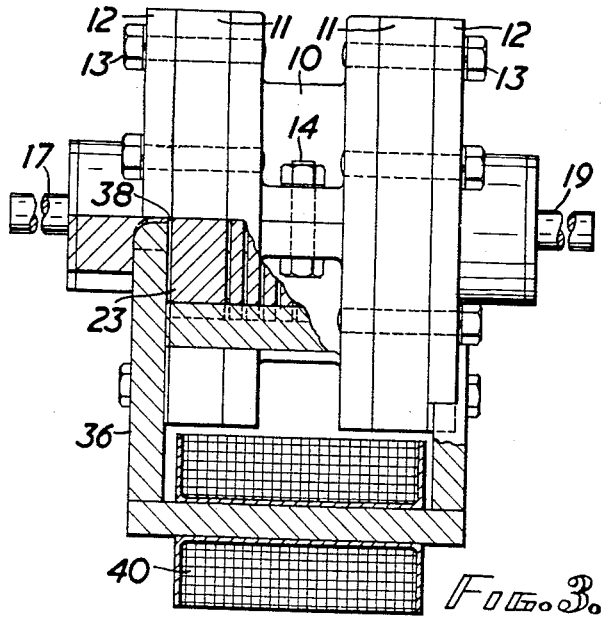

Aug. 17, 1954     J. P. CORBETT     2,686,475
ELECTROHYDRAULIC DEVICE
Filed March 25, 1952     2 Sheets-Sheet 1
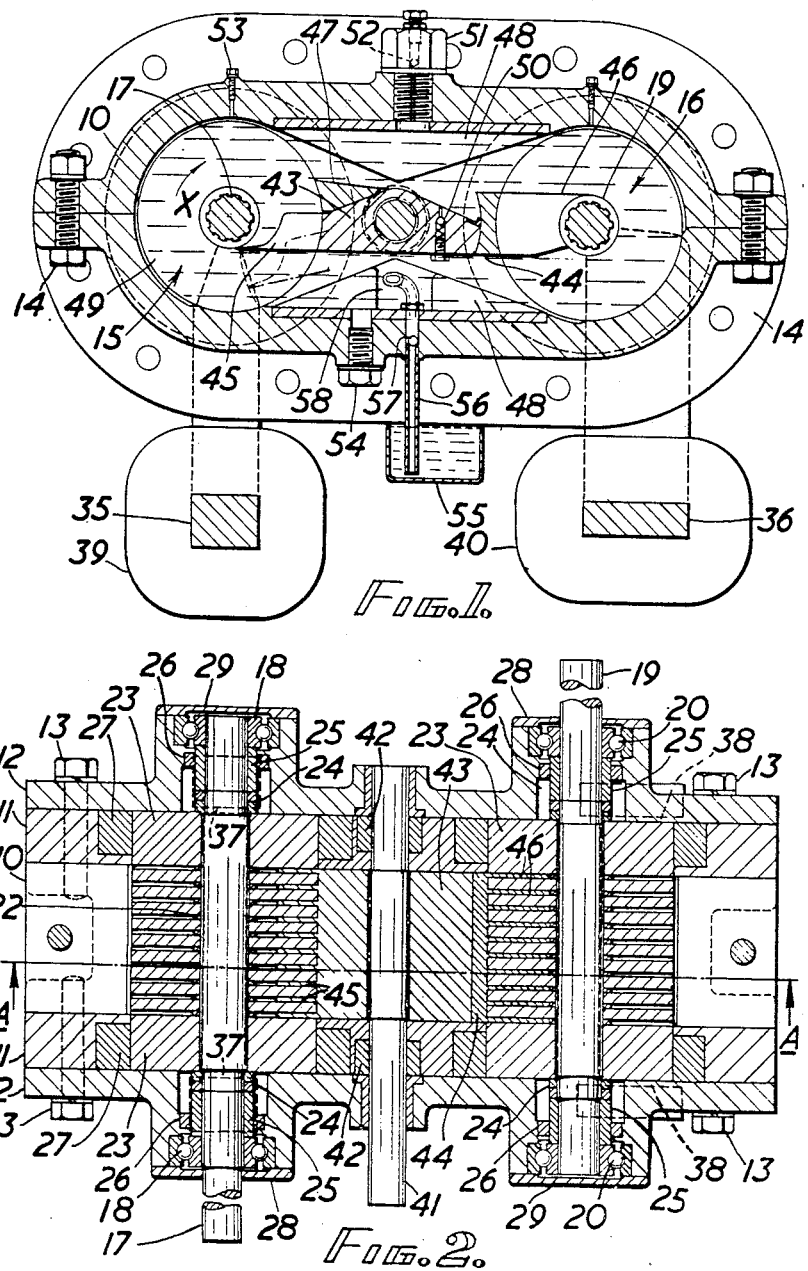

Aug. 17, 1954 J. P. CORBETT 2,686,475
ELECTROHYDRAULIC DEVICE
Filed March 25, 1952 2 Sheets-Sheet 2

Inventor:
James P. Corbett
By Babcock & Babcock
Attorneys

Patented Aug. 17, 1954

2,686,475

UNITED STATES PATENT OFFICE 2,686,475

ELECTROHYDRAULIC DEVICE

James Patrick Corbett, Stafford, England, assignor to The English Electric Company Limited, London, England, a British company Application March 25, 1952, Serial No. 278,398

Claims priority, application Great Britain
April 5, 1951

7 Claims. (Cl. 103—1)

1

This invention relates to an electro-hydraulic device for use with magnetic fluid, i. e. fluid consisting of finely divided ferro-magnetic particles suspended in a suitable carrier such as light oil.

According to the invention the device comprises, in combination, two closely spaced, magnetically separate, rotary members, each member consisting of a plurality of angularly disposed ferro-magnetic elements separated from each other by non-magnetic spacers, non-magnetic enclosure means co-operating with said rotary members so as to define a circumferentially extending duct through which magnetic fluid can flow in contact with the opposing faces of the rotary members, inlet and outlet port means communicating with said duct at circumferentially spaced positions thereof, and between these positions flux-producing means for creating a magnetic field which is stationary in space and extends between said opposing faces of said rotary members so as to link together magnetically only those ferro-magnetic elements which, at any moment, are in alignment with said field, whereby said magnetic fluid, on coming under the influence of said field is congealed within said duct and locked solidly to said aligned ferro-magnetic elements of said rotary members.

The device has a number of applications, for example, by connecting the circumferentially extending duct in a circuit containing magnetic fluid and driving the rotor mechanically, it may be used as a pump for circulating the fluid in the circuit. It may alternatively be used as a motor by connecting the duct to a source of magnetic fluid under pressure.

Two of the devices may be used in combination with their ducts connected together to form a continuous closed circuit so that, if the circuit is filled with magnetic fluid, rotation of one of the rotors will cause the fluid to circulate round the circuit, and thus a corresponding rotation of the other rotor. The two devices may be in separate housings connected together by pipes or they may be combined in a single housing so as to form a self-contained unit. In either case, regulating means may be provided for varying the amount of magnetic fluid passing through one of the ducts relative to the amount of fluid passing through the other duct.

If desired, one only of the devices may be used in combination with a known form of hydraulic pump or rotor to provide a variable speed ratio drive.

A preferred method of carrying out the invention is illustrated in the accompanying drawings

Figures 4, 5:
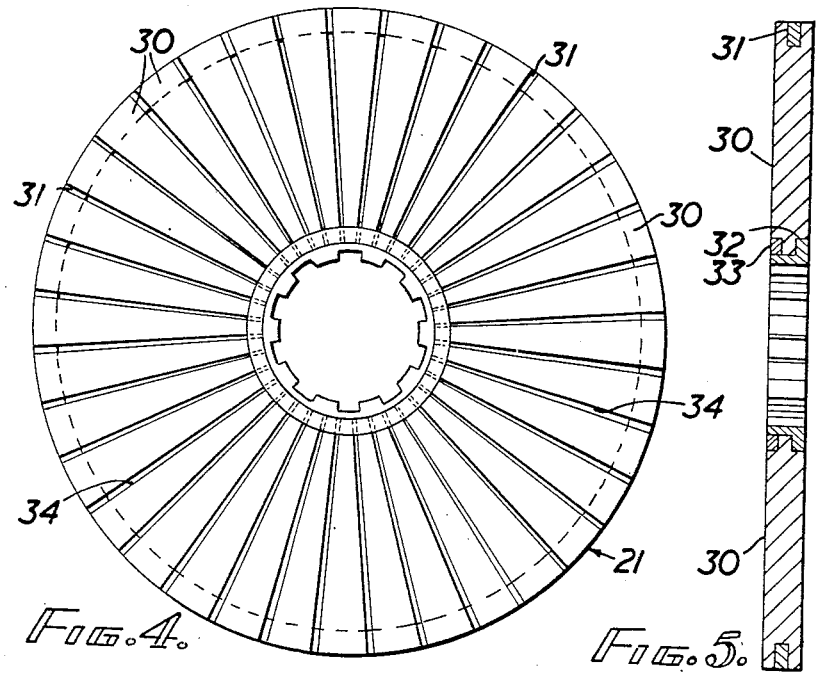

2 where there is shown a variable speed ratio drive embodying the features of the invention. Fig. 1 is a cross sectional elevation of the drive taken on the line A—A of Fig. 2, Fig. 2 is a sectional plan of Fig. 1, whilst Fig. 3 is an end elevation, partly in section. Figs. 4 and 5 show, on a larger scale, an elevation and a cross section respectively through one of the rotor discs.

Referring now to Figs. 1 and 2 of the drawings, the unit comprises a non-magnetic housing consisting of a flanged centre portion 10, split along the horizontal centre line, side spacers 11 and side covers 12, the side spacers and the side covers being secured to the centre portion by means of bolts 13. The two halves of the centre portion 10 are bolted together by means of bolts 14.

Rotatably mounted within the housing are two rotors, generally indicated at 15 and 16 respectively. The rotor 15 is mounted on a shaft 17 which extends through one side of the housing and is journalled in ball bearings 18. The rotor 16 is mounted on the shaft 19 which extends through the opposite side of the housing and is journalled in ball bearings 20.

The two rotors are identical and each is formed from a number of discs, generally indicated at 21 in Figs. 4 and 5, spaced from each other by spacers 22. At each end of the rotor there is provided a spacing disc 23 and the whole assembly is clamped axially on the shaft by means of nuts 24. Spacing tubes 25 between the bearings and the nuts locate the bearings, whilst sealing elements 26, mounted in the side covers 12, co-operate with the spacing tubes to seal the interior of the housing from the bearings. Sealing elements 27, mounted in the side spacers, co-operate with the discs 23 to provide a seal between the circumferential surfaces of the rotors and the side walls of the housing. The ball bearings are closed on the outside by bearing caps 28, 29.

As shown in Figs. 4 and 5, the discs 21 are built up from a number of magnetisable segments 30 rivetted at their outer ends to a non-magnetic supporting ring 31. At their inner ends the segments are rivetted between the flange of a non-magnetic mounting bush 32 and a non-magnetic clamping ring 33, the segments being separated from each other by insulating material 34. The bore of the bush 32 is splined to engage corresponding splines on the rotor shaft.

Two U-shaped electro-magnets 35, 36 are mounted on the housing so as to straddle the rotors 15 and 16 respectively, the pole faces being separated from the ends of the rotors by small air gaps 37 and 38 respectively. The electro-magnets are magnetised by exciting coils 39 and 40. The spacing discs 23 are built up from magnetisable sectors magnetically insulated from each other in the same way as the discs 21.

Extending through the housing between the two rotors is a speed ratio control shaft 41 journalled in the side walls of the housing and sealed by sealing elements 42 in the side spacers 11. This shaft carries a non-magnetic control member 43 which extends transversely between the side spacers 11 so as to divide the interior of the housing into upper and lower halves. At the right hand end of this control member a radial surface is formed which co-operates with a corresponding surface on a fixed non-magnetic dividing piece 44 which also extends transversely between the side spacers 11.

At the opposite side the control member 43 is formed with a plurality of pointed vanes 45 which extend into the spaces between the discs of the rotor 15. The fixed dividing piece 44 is also provided with vanes 46 which extend into the spaces between the discs of the rotor 16. A further fixed non-magnetic dividing member 47 is provided adjacent the rotor 15. Fixed non-magnetic mixing vanes 48 of triangular shape are provided inside the housing in line with the spaces between the discs of the two rotors. The interior of the housing is filled with magnetic fluid 49.

With the exciting coils 39 and 40 energised, stationary magnetic fields are set up by the electro-magnets which extend axially through each rotor between the corresponding pole faces and which are confined substantially to the arcs of the rotors covered by the pole faces. Over these arcs only, therefore, the magnetic fluid filling the space between the magnetic discs of each rotor will congeal and lock substantially solid with the respective rotor.

If now one of the shafts, for example the shaft 17, is rotated in the direction of the arrow X by an external force then, since the magnetic fluid under the influence of the electro-magnet 35 is locked to the rotor 15, free fluid will be forced out of this rotor and across the upper passage of the housing into the rotor 16. This free fluid on entering the rotor 16 will react with the solid sectors of fluid locked, under the influence of the electro-magnet 36, to the rotor, thereby causing this rotor also to rotate. Rotation of this rotor will, of course, force free fluid across the lower passage in the housing so that as the fluid in the rotor 15 is freed from the magnetic field extending between the pole faces of the electro-magnet 35, further free fluid will enter the rotor to take its place.

As long as the shaft 17 is rotated therefore, a continuous circulating action of the magnetic fluid is set up within the housing, causing the shaft 19 also to rotate. With the control member 43 in the position shown, the whole of the fluid circulates round the housing and the ratio of speeds of the two shafts 17 and 19 will be unity.

If now the control member 43 is rotated to the dotted position, some only of the free magnetic fluid leaving the rotor 15 will be fed to the rotor 16 whilst the remainder, due to the back pressure on the fluid, will pass directly round the rotor 15 without circulating around the housing. Since a proportion only of the fluid is now fed to the rotor 16, this rotor will only need to revolve at a reduced speed to pass the fluid round the housing and a speed reduction will be obtained between the input and the output shaft. Obviously by rotating the control member to the appropriate position, any speed ratio between unity and zero may be obtained.

A spring-loaded one-way ball valve 50 in the control member 43 allows the magnetic fluid to by-pass the rotor 16 if the pressure in the upper passage of the housing becomes excessive, for example, due to the locking of the rotor 16. The maximum torque which can be transmitted is, of course, dependent on the force required to shear the congealed magnetic fluid from the rotors.

The housing is filled with the magnetic fluid through a filling vent normally closed by a screwed filling plug 51. This plug has fitted thereto a spring-loaded ball valve 52 which operates as a safety device allowing fluid to escape if the pressure within the housing becomes excessive. To allow the air within the housing to escape as the fluid is being poured in, vent holes, normally closed by screwed plugs 53, are provided in the top wall of the housing. A drain plug 54 is provided in the bottom wall of the housing.

Mounted beneath the housing is a sump 55 which is open to atmospheric pressure and which contains a reserve supply of magnetic fluid. This sump communicates with the interior of the housing through a feed pipe 56 incorporating a one-way ball valve 57 which prevents return of the magnetic fluid from the interior of the housing into the sump. The top end of the pipe is bent in the direction of flow of the magnetic fluid so that a Pitot action is set up which results in fluid being automatically drawn from the sump to replace any fluid which may escape from the housing.

The mixing vanes 48 are cut away at 58 to accommodate the end of the feed pipe 56. The mixing vanes provide obstacles in the path of the fluid flow and help to mix the ferro-magnetic particles which, due to centrifugal action, tend to concentrate towards the outer periphery of the rotors as the fluid leaves the rotors.

The electro-magnets may be excited either from an A. C. or a D. C. source and the excitation may be made variable so as to obtain a variable amount of slip between one or both rotors and the magnetic fluid. If desired, the electro-magnets may be replaced by permanent magnets. A control member may be provided for each rotor, thereby increasing the range of speed ratios obtainable. Either shaft may be made the input shaft and the device can be run in either direction.

In an alternative form of variable speed ratio drive the magnetisable discs of one of the rotors are slidably mounted thereon and means are provided for moving the discs on the shaft so as to vary the cross-sectional area of the ducts formed between the discs. The discs may be moved, e. g. by means of circular wedge-shaped members which are mounted to force the discs apart as they are rotated and which at the same time form a wall for guiding the fluid round the rotor.

It will be appreciated that other arrangements of the device may be made without altering the principle of operation, e. g. tapered of sphere shaped rotors may be used in place of the cylindrical rotors described in the specific embodiment. In another arrangement, a plain cylindrical rotor is used in combination with a housing having a plurality of internal annular grooves.

What I claim as my invention and desire to secure by Letters Patent is:

1. An electro-hydraulic device comprising, in combination, two closely spaced, magnetically separate, rotary members, each member consisting of a plurality of angularly disposed ferro-magnetic elements separated from each other by non-magnetic spacers, non-magnetic enclosure means co-operating with said rotary members so as to define a circumferentially extending duct through which magnetic fluid can flow in contact with the opposing faces of the rotary members, inlet and outlet port means communicating with said duct at circumferentially spaced positions thereof, and between these positions flux-producing means for creating a magnetic field which is stationary in space and extends between said opposing faces of said rotary members so as to link together magnetically only those ferro-magnetic elements which, at any moment, are in alignment with said field, whereby said magnetic fluid, on coming under the influence of said field is congealed within said duct and locked solidly to said aligned ferro-magnetic elements of said rotary members.

2. An electro-hydraulic device comprising, in combination, two closely spaced, magnetically separate, rotary members, each member consisting of a plurality of angularly disposed ferro-magnetic elements separated from each other by non-magnetic spacers, non-magnetic enclosure means co-operating with said rotary members so as to define a circumferentially extending duct through which magnetic fluid can flow in contact with the opposing faces of the rotary members, inlet and outlet port means communicating with said duct at circumferentially spaced positions thereof, flux-producing means between these positions for creating a magnetic field which is stationary in space and extends between said opposing faces of said rotary members so as to link together magnetically only those ferro-magnetic elements which, at any moment, are in alignment with said field, whereby said magnetic fluid, on coming under the influence of said field is congealed within said duct and locked solidly to said aligned ferro-magnetic elements of said rotary members, and adjustable feed-back means for feeding a predetermined proportion of the magnetic fluid leaving the influence of the magnetic field directly back to the position where it again comes under the influence of said magnetic field.

3. An electro-hydraulic device comprising, in combination, a rotary member including a plurality of axially spaced, magnetically separate discs, each disc consisting of a plurality of angularly disposed ferro-magnetic elements separated from each other by non-magnetic spacers, non-magnetic enclosure means co-operating with said rotor so as to define a plurality of circumferentially extending ducts through which magnetic fluid can flow in contact with the opposing faces of said discs, common inlet and outlet port means communicating with said ducts at circumferentially spaced positions thereof, and between these positions flux-producing means for creating a magnetic field which is stationary in space and extends axially through said rotor across said ducts so as to link together magnetically only those ferro-magnetic elements which, at any moment, are in alignment with said field, whereby magnetic fluid, on coming under the influence of said field, is congealed within the ducts and locked solidly to said aligned ferro-magnetic elements.

4. An electro-hydraulic device comprising, in combination, a rotary member including a plurality of axially spaced, magnetically separate discs, each disc consisting of a plurality of angularly disposed ferro-magnetic elements separated from each other by non-magnetic spacers, non-magnetic enclosure means co-operating with said rotor so as to define a plurality of circumferentially extending ducts through which magnetic fluid can flow in contact with the opposing faces of said discs, common inlet and outlet port means communicating with said ducts at circumferentially spaced positions thereof, flux-producing means between these positions for creating a magnetic field which is stationary in space and extends axially through said rotor across said ducts so as to link together magnetically only those ferro-magnetic elements which, at any moment, are in alignment with said field, whereby magnetic fluid, on coming under the influence of said field, is congealed within the ducts and locked solidly to said aligned ferro-magnetic elements, and adjsutable feed-back means for feeding a predetermined proportion of the magnetic fluid leaving the influence of the magnetic field directly back to the position where it again comes under the influence of said magnetic field.

5. An electro-hydraulic device according to claim 4 wherein said feed-back means comprises a plurality of movable vanes projecting into said ducts so as to allow a predetermined amount of magnetic fluid to circulate continuously around said ducts.

6. An electro-hydraulic device according to claim 5 wherein said flux-producing means comprises a permanent magnet having oppositely disposed pole faces positioned one at each end of said rotor.

7. An electro-hydraulic device according to claim 5 wherein said flux-producing means comprises an electro-magnet having oppositely disposed pole faces positioned one at each end of said rotor.

References Cited in the file of this patent

UNITED STATES PATENTS

| Number | Name | Date |
|---|---|---|
| 697,143 | Harding | Apr. 8, 1902 |
| 2,553,380 | Putt | May 15, 1951 |
| 2,575,360 | Rabinow | Nov. 20, 1951 |

FOREIGN PATENTS

| Number | Country | Date |
|---|---|---|
| 670,061 | France | Aug. 12, 1929 |